(12) United States Patent
Reuter et al.

(10) Patent No.: US 10,315,128 B2
(45) Date of Patent: Jun. 11, 2019

(54) DEPHLEGMATOR

(75) Inventors: Hanno Carl Rudolf Reuter, Cape Town (ZA); Detlev G. Kröger, Cape Town (ZA)

(73) Assignee: Stellenbosch University, Stellenbosch, Western Cape Province (ZA)

( * ) Notice: Subject to any disclaimer, the term of this patent is extended or adjusted under 35 U.S.C. 154(b) by 1074 days.

(21) Appl. No.: 14/232,813

(22) PCT Filed: Jul. 10, 2012

(86) PCT No.: PCT/IB2012/053511
§ 371 (c)(1),
(2), (4) Date: Aug. 11, 2014

(87) PCT Pub. No.: WO2013/011414
PCT Pub. Date: Jan. 24, 2013

(65) Prior Publication Data
US 2014/0367243 A1 Dec. 18, 2014

(30) Foreign Application Priority Data

Jul. 15, 2011 (ZA) .................................. 2011/05232
Nov. 29, 2011 (ZA) .................................. 2011/08738

(51) Int. Cl.
*B01D 5/00* (2006.01)
*F28B 1/02* (2006.01)
(Continued)

(52) U.S. Cl.
CPC .............. *B01D 5/0009* (2013.01); *F28B 1/06* (2013.01); *F28B 9/00* (2013.01); *F28D 1/05325* (2013.01); *F28B 1/02* (2013.01); *F28F 2210/10* (2013.01)

(58) Field of Classification Search
CPC ........ B01D 5/0009; B01D 5/063; B01D 1/16; B01D 1/04; B01D 5/0093; B01D 5/0069;
(Continued)

(56) References Cited

U.S. PATENT DOCUMENTS 2,401,918 A 6/1946 Elder et al.
3,868,308 A * 2/1975 Barak ...................... B01D 1/04
159/17.2
(Continued)

FOREIGN PATENT DOCUMENTS

DE 1451131 B1 7/1970
GB 485972 A 5/1938
(Continued)

OTHER PUBLICATIONS

Heyns, Johan Adam, "Performance characteristics of an air-cooled steam condenser incorporating a hybrid (dry/wet) dephlegmator", Dec. 2008, Department of Mechanical Engineering University of Stellenbosch. Available online from Stellenbosch University Library and Information Services at http://scholar.sun.ac.za/handle/10019.1/350.*

(Continued)

*Primary Examiner* — Jonathan Miller
*Assistant Examiner* — Jonathan Luke Pilcher
(74) *Attorney, Agent, or Firm* — Knobbe, Martens, Olson & Bear, LLP

(57) ABSTRACT

A dephlegmator is provided comprising two stages connected in series wherein a first stage includes an air-cooled reflux condenser and a second stage includes a generally horizontal tube bundle of smooth or finned tubes that can be operated selectively in either an air-cooled (dry) mode under selected ambient conditions or in a wet evaporatively cooled mode under other selected ambient conditions including that of elevated ambient temperature. Spray nozzles may be (Continued)

installed above the tube bundle whereby water can be sprayed onto the tube bundle. One or more collection troughs are preferably provided beneath the tube bundle for collecting run-off water and enabling recycling of excess deluge water. Preferably, the tube bundle comprises at least two, and preferably three groups of tubes communicating with each other wherein the second group of tubes has appreciably fewer tubes in it than the first group of tubes and any third group of tubes has appreciably fewer tubes in it than the second group of tubes.

13 Claims, 5 Drawing Sheets

(51) Int. Cl.
    *F28B 1/06*     (2006.01)
    *F28B 9/00*     (2006.01)
    *F28D 1/053*     (2006.01)

(58) Field of Classification Search
    CPC .. Y10S 165/193; F28B 2001/065; F28B 3/02; F28B 1/02; F28B 1/06; F28B 9/08; F28B 9/10; F28F 9/0246; F28F 9/22; F28F 2009/0287; F28F 2009/222; F28F 2009/224; F28F 2009/226; F28F 2009/228
    See application file for complete search history.

(56) References Cited

U.S. PATENT DOCUMENTS

| | | | |
|---|---|---|---|
| 4,417,619 A | * | 11/1983 | Minami ............... F28B 1/06 165/113 |
| 5,139,083 A | | 8/1992 | Larinoff |
| 2011/0100593 A1 | | 5/2011 | Benz |

FOREIGN PATENT DOCUMENTS

| | | | | |
|---|---|---|---|---|
| GB | 900949 A | | 7/1962 | |
| JP | S51-066546 A | | 6/1976 | |
| JP | 58074102 A | * | 5/1983 | ............... F28B 1/06 |
| JP | S58-074102 A | | 5/1983 | |
| JP | H10-002683 A | | 1/1998 | |

OTHER PUBLICATIONS

Owen, M., et al., "Enhancing Turbine Output at Dry-Cooled Power Plants Using a Hybrid (Dry/Wet) Dephlegmator" *Heat Transfer Engineering*, Published Online in 2016 (in 12 pages).

* cited by examiner

DEPHLEGMATOR

FIELD OF THE INVENTION

This invention relates to a dephlegmator of the type employed in steam condensation installations in order to separate non-condensable gases from condensable gases. Such a dephlegmator assumes the form of a secondary reflux condenser that serves to remove non-condensable gases from what is generally steam in one form or another. A dephlegmator of this type is typically used in a steam condensation installation downstream of steam turbines used in electricity generating power plants and downstream of primary condensers.

BACKGROUND TO THE INVENTION

Due to the decreasing availability and rising cost of cooling water, dry-cooling towers or air-cooled steam condensers are increasingly being used to dissipate heat into the environment in power plants that incorporate steam turbines. Unfortunately, at higher ambient temperatures, the effectiveness of such cooling systems decreases and this results in a corresponding reduction in turbine efficiency. Any such reduction in turbine output during hot periods may result in a significant loss in income, especially in areas where the demand and value of electrical energy during these periods is high. Not only that, but the capacity of the cooling system may need to be increased in order to cater for higher ambient temperatures thereby representing an increased capital cost and accompanying increased electricity production costs.

In a direct A-frame air-cooled steam condenser system of the type widely used in power plants, the steam exiting a steam turbine is fed via a steam header to a primary condenser arrangement and residual steam leaving the primary condenser arrangement is condensed in a dephlegmator that allows non-condensable gases to be separated out and typically vented to atmosphere. Such dephlegmators are available in either dry cooling or wet cooling varieties and for reasons set out above, dry cooling may often be preferred in spite of the disadvantage indicated.

As an alternative to the above, so-called adiabatic arrangements have been used in which water is sprayed into the inlet air. However, the improvement achieved in this instance does not appear to be commensurate with the cost involved. However, for the nozzles tested only between 60% and 70% of the spray water is evaporated and even the introduction of a drift eliminator cannot ensure that the finned surfaces of the heat exchange tubes remain dry. The unevaporated water droplets that accumulate on the structure can lead to corrosion of the structure surfaces as well as undesirable rainback that may cause surface and ground water contamination. Finer sprays may be achieved with smaller high pressure nozzles. Due to practical and cost considerations spray cooling of inlet air does not appear likely to find application in large air-cooled condensers.

There is thus a need for a dephlegmator that is aimed at providing an improvement to the existing situation.

SUMMARY OF THE INVENTION

In accordance with this invention there is provided a dephlegmator comprising two stages connected in series wherein a first stage includes an air-cooled reflux condenser and wherein a second stage includes a generally horizontal tube bundle of smooth or finned tubes that can be operated selectively in either an air-cooled (dry) mode under selected ambient conditions or in a wet evaporatively cooled mode under other selected ambient conditions including that of elevated ambient temperature.

Further features of the invention provide for an arrangement of spray nozzles to be installed above the tube bundle whereby water can be sprayed onto the tube bundle in order to provide the evaporatively cooled mode; for drift eliminators to be positioned above the arrangement of spray nozzles to inhibit loss of water in the form of airborne droplets; and for one or more collection troughs to be provided beneath the tube bundle for collecting run-off water and enabling recycling of excess deluge water.

Still further features of the invention provide for the tube bundle to comprise at least two groups of tubes including a first group of tubes that have inlet ends and outlet ends and a second group of tubes that have inlet ends in communication with the outlet ends of the tubes of the first group thereof, the tubes of the second group also having outlet ends, wherein the second group of tubes has appreciably fewer tubes in it than the first group of tubes; for the second group of tubes to comprise approximately 15% to 30%, and preferably about 20%, of the number of tubes in the first group of tubes; and for the tube bundle to have a third group of tubes wherein the tubes of the third group have inlet ends communicating with the outlet ends of the tubes of the second group thereof and wherein the third group of tubes has appreciably fewer tubes in it than the second group of tubes, typically about one third or one quarter.

Yet further features of the invention provide for the first group of tubes to be located vertically above the second group of tubes that is located vertically above any third group of tubes; for the tubes to be inclined towards their outlet ends to provide for condensate drainage towards the outlet end; for the tubes to be arranged in generally horizontal rows thereof with the tubes of one row being offset from the tubes in a vertically adjacent row by one half of the spacing between the tubes; and for the first and second groups of tubes to be grouped at their ends that are in communication by providing a partition in a manifold chamber communicating with the outlet ends of all of the tubes of the first group, the inlet ends of the tubes of the second group, as well as the outlet ends of any third group of tubes; and for the outlet ends of the tubes of the second group to open into a manifold chamber with which communicate the inlet ends of the tubes of a third group of tubes.

In one preferred arrangement of the tube bundle, multiple rows of parallel, generally horizontal tubes are arranged in a generally rectangular array. Each of the first, second, and third group of tubes comprises a number of generally horizontal rows of the parallel tubes. In one arrangement there are 20 rows of tubes in the first group thereof, 4 rows of tubes in a second group thereof and 1 row of tubes in a third group thereof.

In a first variation of the invention the air cooled reflux condenser may be of an A-frame air cooled condenser arrangement of generally known type in which multiple finned tubes extend upwards from two opposite sides to create the A-frame structure. In such an instance the tube bundle can conveniently be positioned at the top of the condenser arrangement. One or more fans for assisting in the flow of air upwards past the heat exchange tubes and towards the tube bundle would typically be located in a horizontal position corresponding to the bottom or a lower region of the finned tubes.

In the instance of an existing A-frame air-cooled condenser installation having a dry dephlegmator, this may be modified to include a second stage as defined above that is capable of being selectively operated either as an air-cooled condenser (dry) or as an evaporatively cooled condenser when the air-side surface of the tube bundle is deluged with water. Alternatively, in the instance of a new installation, the first stage may include somewhat shortened inclined finned tubes that are similar to those used in a dry A-frame configuration;

In a second variation of the invention the air cooled reflux condenser may comprise multiple finned tubes extending downwards at the incline towards each other in an inverted A-frame type of arrangement in which instance the tube bundle may be located at the lower ends of the finned tubes. With such an arrangement one or more fans can be positioned in the region of the upper ends of the downwardly inclined and tubes for drawing air upwards past the finned tubes and towards the horizontal tube bundle.

It will be appreciated that during periods of low ambient temperatures when air-cooling is sufficient, the second stage of the dephlegmator may be operated in a dry mode. However, during hotter periods, deluge water may be sprayed over the generally horizontal tube bundle that typically consists of galvanized steel tubes, and the second stage is then operated as an evaporative condenser. Excess deluge water is typically collected under the tube bundle in troughs and recycled.

The system of the invention has the potential of enhanced thermal performance during periods of high ambient temperatures, while having a lower overall water consumption rate than that of adiabatic pre-cooling of inlet air using a water spray to provide similar performance enhancement.

It is estimated that the capital cost of a condenser installation according to this invention will be only slightly more than that of a standard A-frame air-cooled dephlegmator.

In order that the invention may be more fully understood, further description thereof follows with reference to the accompanying drawings.

DETAILED DESCRIPTION WITH REFERENCE TO THE DRAWINGS

In the embodiment of the invention illustrated in FIGS. 1 to 5 of the drawings, a dephlegmator (1) according to the invention is incorporated into an existing A-frame type of air-cooled (dry) condenser installation comprising multiple primary condensers (2) in what is generally a usual arrangement.

Figure 1:
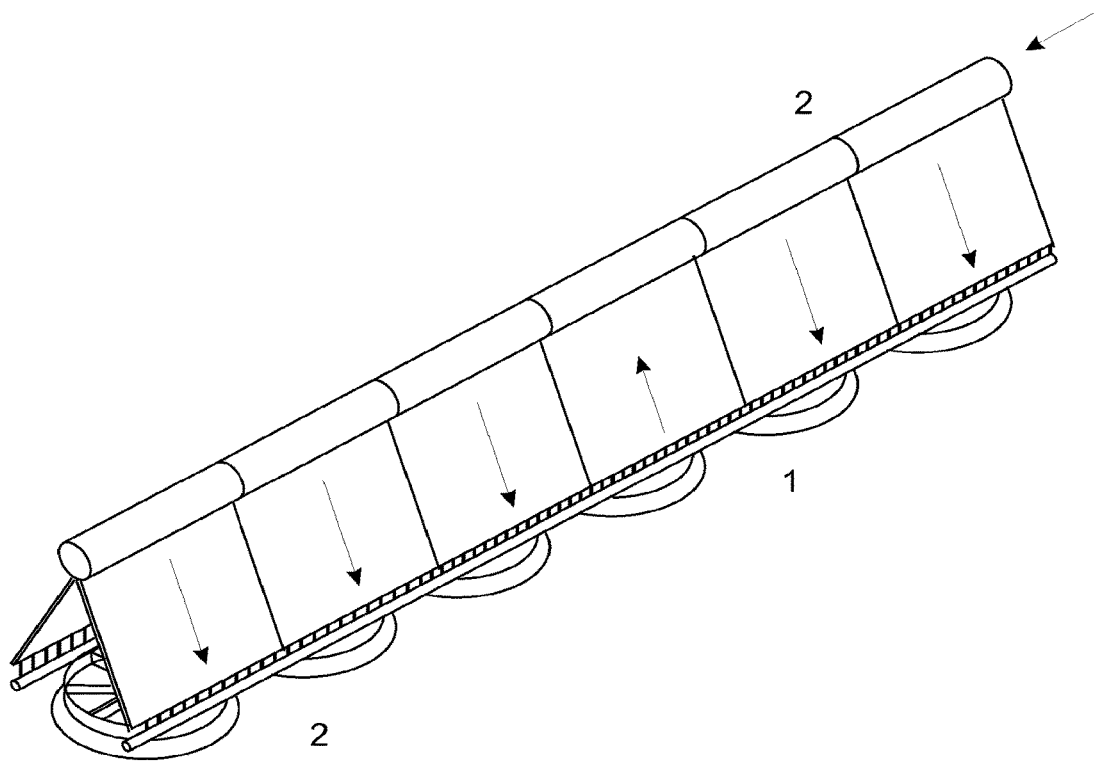
FIG. 1 is a schematic illustration of a typical A-frame air-cooled condenser and dephlegmator assembly.
Figure 2:
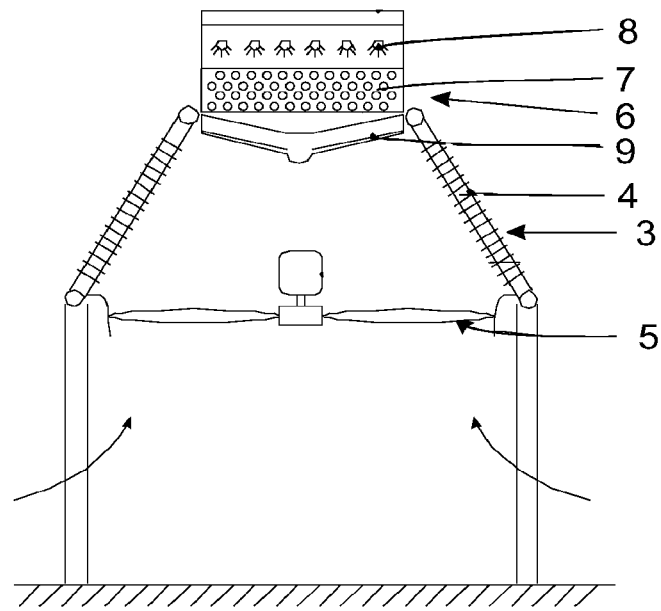
FIG. 2 illustrates schematically, in cross-sectional view, the configuration of one proposed embodiment of hybrid dephlegmator according to the first variation of the invention.
Figure 3:
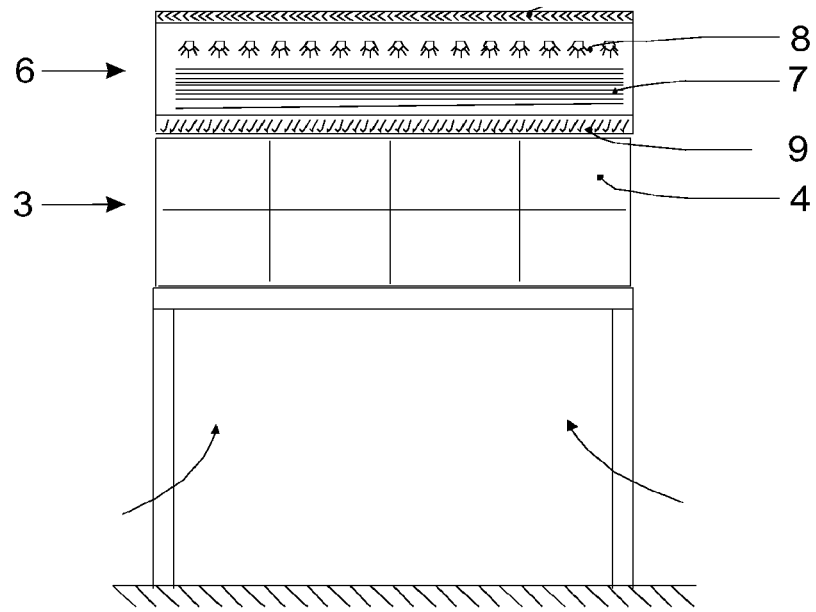
FIG. 3 is a schematic side view thereof.

The dephlegmator itself forms a terminal unit in the flow path of the spent steam emerging from a steam turbine operated electrical energy generating facility and, as more clearly illustrated in FIGS. 2 and 3, conforms to the present invention.

The dephlegmator thus comprises two stages connected in series wherein a first stage (3) is of generally conventional air-cooled reflux condenser construction consisting of multiple inclined finned tubes (4) that are similar to those used in a dry A-frame configuration although, if specially made for the purpose, they may be somewhat shorter. One or more fans (5) located in the region of the lower ends of the inclined finned tubes may be provided for inducing a draught through the tubes.

The second stage (6) of the dephlegmator includes a generally horizontal tube bundle of smooth galvanised tubes (7) with a water deluge spray facility (8) located above the bundle of tubes and a water collection facility in the form of collection troughs (9) located beneath the tube bundle for collecting run-off water and enabling recycling of excess deluge water.

The second stage can be operated selectively in either an air-cooled (dry) mode under selected ambient conditions or in a wet evaporatively cooled mode under other selected ambient conditions including, especially, elevated ambient temperature.

Figure 4:
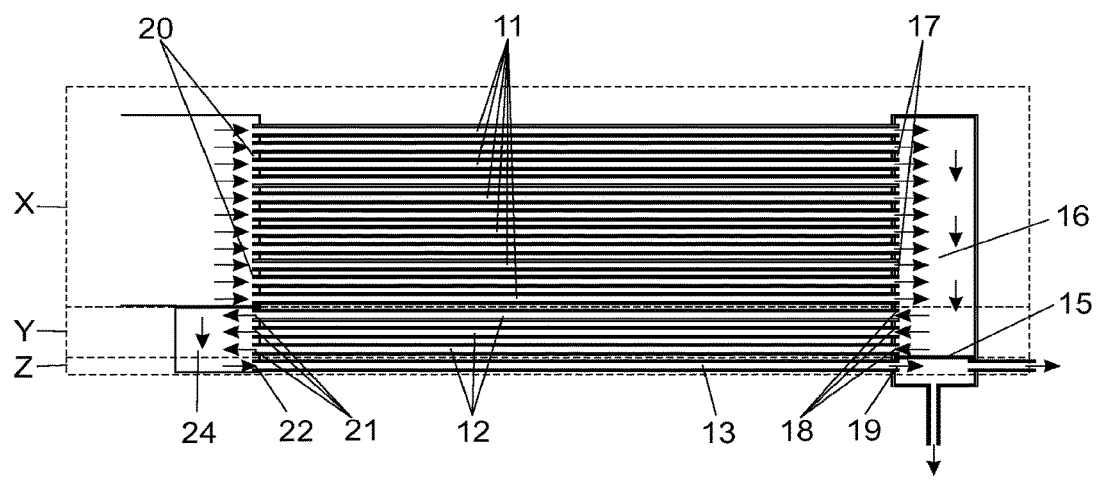
FIG. 4 illustrates schematically, in side view, the configuration of one embodiment of tube bundle for use in a hybrid dephlegmator according to the invention.
Figure 5:
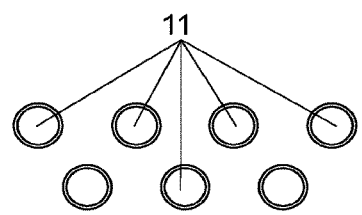
FIG. 5 illustrates schematically in cross-section the relative positioning of tubes in two adjacent rows.
Figure 6:
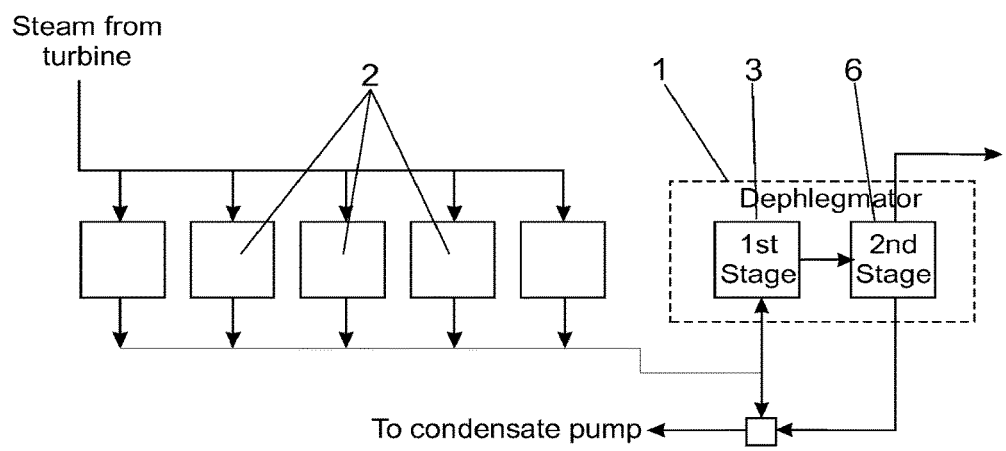
FIG. 6 is a flow diagram of the steam leaving a steam turbine and entering an A-frame condenser installation having a dephlegmator assembly according to the invention.

Referring now more particularly to FIGS. 4 and 5 of the drawings, it has been found that a particular arrangement of tube bundle operates particularly well to enhance the thermal performance of the delugeable tube bundle and ensure that the non-condensable gases are evacuated effectively from the tubes. In order to achieve this, the tube bundle is provided with three tube passes comprising a first group of tubes; a second group of tubes; and a third group of tubes. In this particular instance, the entire tube bundle has 25 horizontal rows of tubes spaced apart vertically.

The first group of tubes (11) that is indicated by a dotted envelope (X) in FIG. 4 has 20 rows in it and is located uppermost. The second group of tubes (12) that is indicated by a dotted envelope (Y) has 4 rows of tubes in it and is located immediately below the first group of tubes. The third group of tubes (13) that is indicated by dotted envelope (Z) has 1 row of tubes in it and is located lowermost.

In all cases, and as shown schematically in FIG. 5 the tubes in a row are spaced apart by approximately the outer diameter of the tubes themselves and the tubes in one row are offset from tubes in an adjacent row by a distance equal to the outer diameter of a tube so that water falling between two tubes of one row will fall on the tubes of the next row.

All of the tubes are slightly inclined to the horizontal along their length such that their outlet ends are somewhat lower than their inlet ends simply to ensure effective drainage of condensation towards the ultimate outlet end of the third group of tubes. The inclination need only be small and could, for example, be of the order of 50 mm with a tube length of 2.5 meters.

The ends of the tubes are interconnected by providing a partition (15) in a large manifold chamber (16) communicating with the outlet ends (17) of all of the tubes of the first group; the inlet ends (18) of the tubes of the second group; and the outlet ends (19) of the tubes of the third group of tubes so as to divide off the outlet ends of the third group of tubes. The inlet ends (20) of the tubes of the first group of tubes are arranged to receive the inlet gases from the first stage of the dephlegmator.

Communication between the outlet ends (21) of the second group of tubes and the inlet ends (22) of the third group of tubes is achieved by means of a relatively small manifold chamber (24) adjacent the inlet ends of the first group of tubes.

The arrangement is such that the inlet gases pass through the first group of tubes into the large manifold chamber where they reverse direction and enter the inlet ends of the tubes of the second group of tubes. From the outlet ends of the second group of tubes the gases again reverse direction in order to pass into the inlet ends of the tubes of the third group of tubes.

The non-condensable gases will ultimately be accumulated in the outlet header from where they can be evacuated by means of an ejector and the condensate will drain under the influence of gravity.

The effective evacuation of non-condensibles, prevents sub-cooling of the condensate in the dephlegmator which would increase the absorption of oxygen into the condensate which could result in increased corrosion. Furthermore, subcooling could result in freezing of the condensate in winter thereby causing tube damage and finally requiring additional regenerative heating of the feedwater before it is returned to the boiler. Sub-cooling is therefore best avoided.

It will be appreciated that during periods of low ambient temperatures in which air-cooling is sufficient, the second stage of the dephlegmator may be operated in a dry mode. However, during hotter periods, deluge water may be sprayed over the generally horizontal tube bundle so that it is then operated as an evaporative condenser.

This system has the potential of enhanced thermal performance during periods of high ambient temperatures, while having a lower overall water consumption rate than in the instance of adiabatic pre-cooling of inlet air using a water spray whilst giving the same performance enhancement.

It is to be noted that the finned tubes of the unit remain dry thereby reducing the risk of corrosion as well as scaling while the galvanized wetted plain tube surfaces of the tube bundle may be rinsed with clean water on a regular scheduled basis to minimize fouling.

Figure 7:
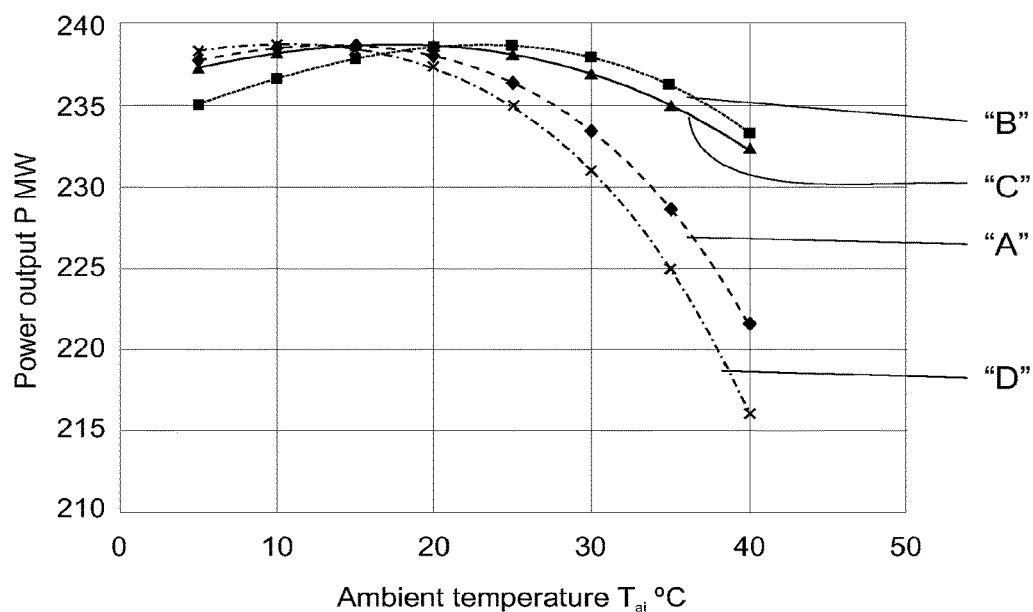
FIG. 7 is a comparative graph showing the power output associated with four different configurations of condenser units; and, FIG. 8 is a view similar to FIG. 2 of an embodiment of the second variation of the invention.

Initial comparative test results are shown in FIG. 7 in which the power output in megawatts of a test facility is plotted against the ambient temperature in degrees centigrade. The curve indicated by the letter "A" relates to a prior art three street dry A-frame condenser installation; the curve indicated by the letter "B" relates to a prior art four street dry A-frame condenser installation; the curve indicated by the letter "C" relates to a three street condenser assembly including a dephlegmator according to the invention operated in the wet mode; and, the curve indicated by the letter "D" relates to a three street condenser assembly including a dephlegmator according to the invention operated in the dry mode.

It will be noted that by utilising evaporative cooling in a dephlegmator as provided by the present invention, the power output of a power generating facility can be increased significantly during hot periods, thereby increasing revenues and power plant efficiency The cooling system according to the invention may use existing A-frame air-cooled condenser technology and through the introduction of a hybrid (dry or wet) dephlegmator there is achieved a measurable enhancement in cooling performance during higher ambient temperatures. During these periods the hybrid (dry or wet) condenser operating in a wet mode can achieve the same increased turbine performance as an oversized air-cooled condenser or an air-cooled condenser with adiabatic cooling (spray cooling) of the inlet air, but at a considerably lower cost. For the same turbine power output the water consumed by an air-cooled condenser incorporating a hybrid (dry or wet) dephlegmator is measurably less than an air-cooled condenser with adiabatic cooling of the inlet air.

It will be understood that in one implementation of the invention as applied to existing installations, only the dephlegmators need to be modified thereby enabling existing air-cooled steam condensers to be retrofitted to operate in terms of the invention.

Figure 8:
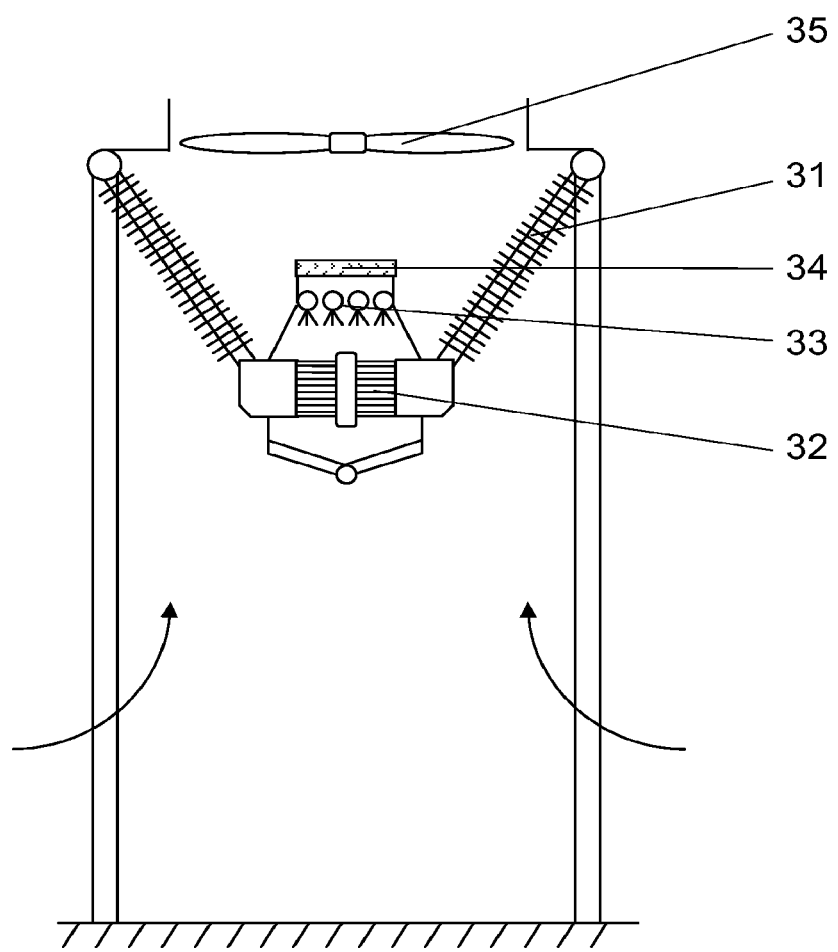

Of course the invention can be applied to arrangements other than those of a standard A-frame configuration and FIG. 8 illustrates one alternative arrangement. In that arrangement two series of finned condenser tubes (31) are inclined downwardly towards each other in a type of inverted A-frame configuration with the tube bundle (32) being arranged between their lower ends at a suitable position along the length the condenser arrangement. An arrangement of spray nozzles (33) is supported above the tube bundle and drift eliminators (34) are located above the spray nozzles in order to capture at least some of any spray that may escape upwards. One or more fans (35) for inducing a draught through the finned condenser tubes and past the tube bundle can, in this instance, conveniently be located in the region of the upper ends of the finned condenser tubes.

Whatever construction is used, it is estimated that the capital cost of the hybrid (dry or wet) dephlegmator according to the invention will be only slightly more than that of a standard A-frame air-cooled dephlegmator.

Numerous variations to what is described above may be made within the scope of the invention.

The invention claimed is:

1. A dephlegmator for separating non-condensable gases from condensable gases disposed in a flow path of spent steam comprising a generally horizontal tube bundle of smooth or finned tubes that can be operated selectively in either an air-cooled (dry) mode under selected ambient conditions or in a wet evaporatively cooled mode under other selected ambient conditions including that of elevated ambient temperature, wherein the tube bundle comprises at least three groups of tubes comprising a first group of tubes, a second group of tubes, and a third group of tubes, wherein the first group of tubes has inlet ends and outlet ends, the second group of tubes has inlet ends and outlet ends, the inlet ends being in communication with the outlet ends of the tubes of the first group, the second group of tubes comprising from 15% to 30% of the number of tubes of the first group of tubes, and the tubes of the third group has inlet ends and outlet ends, the inlet ends communicating with the outlet ends of the tubes of the second group, the number of tubes in the third group of tubes is about one third to one quarter of the number of tubes in the second group of tubes, wherein the dephlegmator further comprises a manifold chamber connected to the outlet ends of the tubes of the third group, wherein the manifold chamber comprises a first outlet and a second outlet to separate the non-condensable gases from a condensate of the condensable gases, and wherein the non-condensable gases are discharged from the first outlet, and the condensate of the condensable gases is drained from the second outlet, wherein the third group of tubes is arranged at the end of the tube bundle as a final group of tubes.

2. The dephlegmator as claimed in claim 1, wherein an arrangement of spray nozzles is installed above the tube bundle whereby water can be sprayed onto the tube bundle in order to provide the evaporatively cooled mode.

3. The dephlegmator as claimed in claim 1, wherein a drift eliminator is positioned above the arrangement of spray nozzles to inhibit loss of water in the form of airborne droplets.

4. The dephlegmator as claimed in claim 1, wherein one or more collection troughs are provided beneath the tube bundle for collecting run-off water and enabling recycling of excess deluge water.

5. The dephlegmator as claimed claim 1, wherein the first group of tubes is located vertically above the second group of tubes that is located vertically above the third group of tubes.

6. The dephlegmator as claimed in claim 1, wherein the first and second group of tubes are grouped at their ends that are in communication by providing a manifold chamber communicating with the outlet ends of all of the tubes of the first group and the inlet ends of the tubes of the second group, with a partition so as to divide off the outlet ends of the third group of tubes.

7. The dephlegmator as claimed in claim 1, wherein the outlet ends of the tubes of the second group open into a manifold chamber with which the inlet ends of the tubes of the third group of tubes communicate.

8. The dephlegmator as claimed in claim 1, wherein a first stage is an A-frame air cooled condenser arrangement in which multiple finned tubes extend upwards from two opposite sides to create an A-frame structure and a second stage tube bundle is positioned at the top of the condenser arrangement.

9. The dephlegmator as claimed in claim 8, wherein an existing A-frame air-cooled condenser installation having a dry dephlegmator is modified to include a second stage that is capable of being selectively operated either as an air-cooled condenser (dry) or as an evaporatively cooled condenser when an air-side surface of the tube bundle is deluged with water.

10. The dephlegmator as claimed in claim 1, comprising multiple finned tubes extending downwards at an incline towards each other in an inverted A-frame type of arrangement in which instance the tube bundle is located at the lower ends of the finned tubes.

11. The dephlegmator as claimed in claim 1, wherein the tubes are inclined towards the outlet ends of the tubes to provide for a condensate drainage towards the outlet ends.

12. The dephlegmator as claimed in claim 1, wherein the tubes are arranged in generally horizontal rows thereof with the tubes of one row being offset from the tubes in a vertically adjacent row by one half of a spacing between the tubes.

13. The dephlegmator as claimed in claim 1, wherein the third group of tubes is disposed in one generally horizontal row.

* * * * *